US009432466B2

(12) United States Patent
Vijay et al.

(10) Patent No.: US 9,432,466 B2
(45) Date of Patent: Aug. 30, 2016

(54) MEMBER TIME ZONE INFERENCE

(71) Applicant: LinkedIn Corporation, Mountain View, CA (US)

(72) Inventors: Ravi Kiran Holur Vijay, Mountain View, CA (US); Benjamin Arai, San Jose, CA (US); Mark Hull, San Jose, CA (US); Utku Irmak, San Francisco, CA (US); Pramod Khincha, San Jose, CA (US); Samir M. Shah, San Francisco, CA (US); Ji Yan, Mountain View, CA (US); Lawrence Yuan, Campbell, CA (US)

(73) Assignee: LinkedIn Corporation, Mountain View, CA (US)

( * ) Notice: Subject to any disclaimer, the term of this patent is extended or adjusted under 35 U.S.C. 154(b) by 119 days.

(21) Appl. No.: 14/292,245

(22) Filed: May 30, 2014

(65) Prior Publication Data
US 2015/0350350 A1    Dec. 3, 2015

(51) Int. Cl.
*G06F 15/16*    (2006.01)
*H04L 29/08*    (2006.01)
*H04L 29/12*    (2006.01)

(52) U.S. Cl.
CPC ............. *H04L 67/18* (2013.01); *H04L 61/609* (2013.01)

(58) Field of Classification Search
CPC ............................. H04L 67/18; H04L 61/609
See application file for complete search history.

(56) References Cited

U.S. PATENT DOCUMENTS

| | | | | |
|---|---|---|---|---|
| 7,948,832 B1* | 5/2011 | Luo | ....................... | G06Q 10/109 368/21 |
| 8,504,059 B2* | 8/2013 | Huang | ....................... | G01S 5/02 370/252 |
| 8,620,345 B2* | 12/2013 | Huang | .................... | H04W 4/02 368/10 |
| 2007/0189333 A1* | 8/2007 | Naaman | .................... | G06F 1/14 370/477 |
| 2008/0201174 A1* | 8/2008 | Ramasubramanian | | G06F 19/3456 705/3 |
| 2011/0081920 A1* | 4/2011 | Hung | ................... | G06Q 10/109 455/456.3 |
| 2011/0130139 A1* | 6/2011 | Ali | ........................... | H04W 4/02 455/435.1 |
| 2013/0100863 A1* | 4/2013 | Guerra | ................ | H04L 12/1407 370/259 |
| 2014/0281917 A1* | 9/2014 | Alpern | ................ | G06F 17/2247 715/234 |
| 2015/0264531 A1* | 9/2015 | Kim | ........................ | H04W 4/12 455/414.3 |

* cited by examiner

*Primary Examiner* — Jonathan Bui
(74) *Attorney, Agent, or Firm* — Schwegman Lundberg & Woessner, P.A.

(57) ABSTRACT

Techniques for inferring a time zone of a user (e.g., a member of an online social network service) are described. According to various embodiments, it is determined that a particular member of an online social networks service is currently located in a particular country. Responsive to determining that a single time zone is associated with the particular country, it is determined that the particular member is currently located in the single time zone. Responsive to determining that multiple time zones are associated with the particular country, an IP address associated with a user login request is accessed, a geographic location associated with the IP address is identified, and a specific one of the multiple time zones that corresponds to the geographic location is identified. It is determined that the particular member is currently located in the specific time zone.

18 Claims, 9 Drawing Sheets

MEMBER TIME ZONE INFERENCE

TECHNICAL FIELD

The present application relates generally to data processing systems and, in one specific example, to techniques for inferring a time zone of a user (e.g., a member of an online social network service).

BACKGROUND

Online social networks such as LinkedIn® offer a wide range of products and services to millions of members. Typically, such online social networks are accessible in different countries, and thus the members of online social networks may be located in various locations around the world.

BRIEF DESCRIPTION OF THE DRAWINGS

Some embodiments are illustrated by way of example and not limitation in the figures of the accompanying drawings in which.

DETAILED DESCRIPTION

Figure 1:
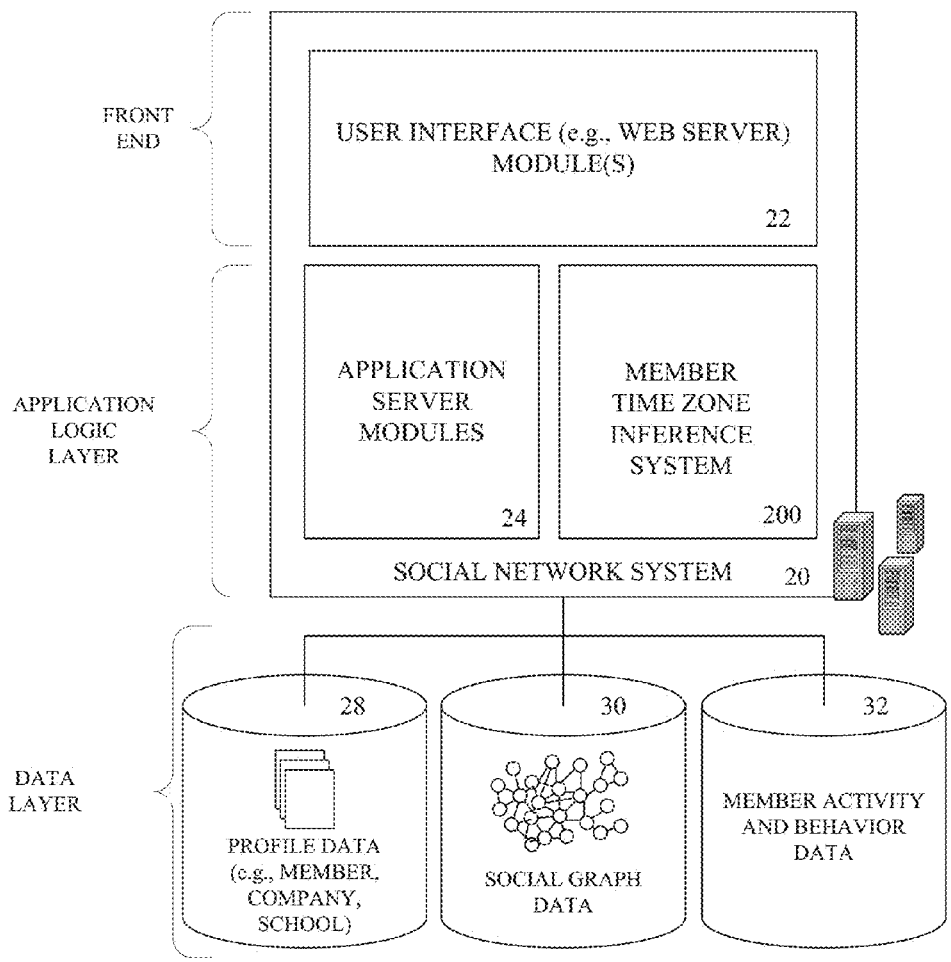
FIG. 1 is a block diagram showing the functional components of a social networking service, consistent with some embodiments of the invention.

Example methods and systems for inferring a time zone of a user (e.g., a member of an online social network service) are described. In the following description, for purposes of explanation, numerous specific details are set forth in order to provide a thorough understanding of example embodiments. It will be evident, however, to one skilled in the art that the present invention may be practiced without these specific details.

According to various example embodiments, a member time zone inference system is configured to determine a time zone in which a user (e.g., a member of an online social network service) is located.

For example, in accordance with one example embodiment, the system may utilize a combination of member profile attributes and IP address login information associated with a member in order to determine the current time zone of the member. For example, the system may first analyze member profile attributes of the member in order to determine if they are currently located in a particular country. For example, the system may identify whether a user-specified country attribute identifying a particular country is defined in the member profile information of the member (e.g., as a result of the member specifying their current country of residence when they opened a member account on the online social network service). Thereafter, the system may access publicly available time zone information indicating time zones associated with each of a plurality of countries. If the system determines that a single time zone is associated with the particular country, the system may determine that the member is currently located in that single time zone. On the other hand, if the system determines that multiple time zones are associated with the particular country, then the system may access the last IP address associated with the last member login request from that member (e.g., from the last time that member logged into a website). Based on this IP address, the system may determine a geographic location (e.g., a city) associated with the IP address, and a time zone associated with that geographic location, in order to ultimately identify the specific time zone (from among the multiple time zones in that country) that the particular member is currently located in.

According to various example embodiments, the system may utilize any one of various factors in order to determine the current time zone of the member. For example, the system may analyze member profile attributes associated with the member (e.g., a user-specified country attribute, a current employer attribute, a current educational attribute, etc.). For example, as described above, the system may determine that the member is likely located in a particular geographic location based on a user-specified country attribute or contact information defined in the member profile information of the member (e.g., as a result of the member specifying their current country or contact information when they opened a member account on the online social network service). As another example, the system may determine that a particular member is currently located in a particular geographic location, if a current education attribute included in the member profile associated with that particular member indicates an educational institution located in the particular country. As another example, the system may determine that a particular member is currently located in a particular geographic location, if a current employer attribute included in the member profile associated with that particular member indicates an employer located in that geographic location. Examples of member profile attributes include, without limitation, name, title, industry, geographic location, contact information, current employer, previous employer, current educational institution, previous educational institution, degree, skills, recommendations, endorsements, company size, seniority level, and so on. The system may then identify a time zone associated with a geographic location (based on publically available data indicating correspondences between geographic locations and time zones), and determine that the member is currently located in that particular time zone.

In some embodiments, the system may also take into account member behavioral activity, such as interactions or social activity information posted in connection with various products or features of a website (e.g., the online social network service such as LinkedIn). For example, if the member posts information on an online social network (e.g., Facebook, LinkedIn, Twitter, etc.) indicating that they are currently located at a particular venue (e.g., a "check-in" or status update on Facebook or LinkedIn at a restaurant, event, convention hall, store, city, etc.), the system may determine that the member is currently located at that venue, and may identify the geographic location of that venue. The system may then identify the time zone in which that venue is located (based on publically available data indicating correspondences between geographic locations and time zones), in order to ultimately determine that the member is currently located in that time zone.

In some embodiments, the system may access geolocation information from a mobile device of the member, based on any known geolocation techniques. Thereafter, by determining that the member is currently located in a particular geographic location (e.g., a particular city), the system may identify a time zone associated with that geographic location (based on publically available data indicating correspondences between geographic locations and time zones), and determine that the member is currently located in that particular time zone.

In some embodiments, the system may access IP address information associated with login requests received from the member (e.g., when a member logs into a website, such as website associated with an online social network service). By accessing a recent IP address (e.g., from the last 24 hours) utilized by the member to login to the site, the system may then use known IP address lookup techniques to identify a geographic location associated with this IP address (e.g., a city or state). The system may identify a time zone associated with that geographic location (based on publically available data indicating correspondences between geographic locations and time zones), and determine that the member is currently located in that particular time zone.

It is understood that the system described herein may utilize any combination of the aforementioned sources of information (e.g., member profile data, member behavioral activity, member interactions with the site, geolocation information, IP address login information, and so on) in order to determine the particular time zone of the member.

For example, in some embodiments, the system may take into account any combination of the aforementioned sources of information in order to determine a probability or "confidence score" indicating the likelihood that the member is currently located in a particular time zone. For example, in some embodiments, weights may be assigned to each of the various sources of information (including user-specified country attribute in the member profile data, a current university attribute in the member profile data, a current employer attribute in the member profile data, current location or "check-in" information displayed in a post or status update by the member on an online social network service, geolocation information, IP address login information, and so on). Thus, in some example embodiments, the system may determine the current time zone of the member based on different sources of information, and if there is a discrepancy in these determinations, the system may place a greater emphasis on the determination from a first source of information if that first source of information is associated with a higher weight. As an example, the system may place a lower weight on member profile data of the member, but a higher weight in the geolocation information from the member's mobile device. Accordingly, if the member profile data of the member indicates that the member is currently located in the US, but the geolocation information from the mobile device of the member indicates a location in Bangalore, India, the system may determine that the member is currently located in the time zone associated with Bangalore, India, due to the higher weight assigned to the geolocation information. Put another way, in this example, the geolocation information effectively overrides the information from the member profile data of the member. Thus, the system may generate a higher confidence score associated with the possibility that the member is located in the time zone associated with Bangalore, India.

In some embodiments, the system may display a user interface allowing a user of the system (e.g., an administrator or website personnel) to adjust any of the aforementioned weights, in accordance with campaign goals and various product objectives. For example, the success of some e-mail products may depend on understanding the current time zone of the member, in order to effectively target emails and other content to the member. If it is important for a particular product to have access to the real-time time zone of the member (e.g., perhaps for an e-mail being sent immediately), then the geolocation information, IP address information, or the social activity information may be given greater importance and be assigned a higher weight, whereas the member profile data may be assigned smaller weight. On the other hand, if it is important for a particular product to have access to a stable long-term time zone of the member (e.g., perhaps for weekly or monthly digest e-mails being transmitted to the member), then perhaps the member profile data may be assigned a higher weight in comparison to other sources of information.

As described above, the system may take into account any combination of the aforementioned sources of information in order to determine a probability or "confidence score" indicating the likelihood that the member is currently located in a particular time zone. In some embodiments, the system may perform prediction modeling, using one or more prediction models (e.g., statistical machine learning models), in order to generate the aforementioned confidence score. Examples of prediction models include a logistic regression model, a Naïve Bayes model, a support vector machines (SVM) model, a decision trees model, and a neural network model. For example, in some embodiments, a prediction model may be trained based on feature data (e.g., member profile data, social activity information, geolocation information, IP address login information, etc.) associated with a large plurality of members located in known time zones. Once trained, the prediction module may receive available features associated with a single particular member (e.g., member profile data, social activity information, geolocation information, IP address login information, etc.) in order to determine the likelihood that this member is currently located in a particular time zone.

In some embodiments, the system may take into account historical data associated with any of the aforementioned sources of information in order to detect a change in time zone associated with the member, and in order to determine whether such a change in time zone represents a permanent or temporary change in time zone. For example, by examining the IP address information associated with the member, the system may detect a change in the IP address used by the member to login to the site. Based on this information, the system may determine not only the current time zone of the member as describe above, but also that the current time zone of the member represents a change in time zone. Moreover, by analyzing a log of the previous IP addresses used by the member to login to the site, the system may determine that, since only the last IP address has changed, there is a high confidence score or likelihood that this is only a temporary change in time zone. This confidence score or likelihood may be reinforced by any of the other aforementioned sources of information (e.g., member profile data, social activity information, etc., which may not indicate any historical change). On the other hand, if the system determines that the last 20 IP addresses used to login to the site have changed to correspond to a new geographic location, and that the member profile data of the member indicates a new employer located at that geographic location, then the system may determine that there is a high confidence score or likelihood that this is a permanent change in time zone. In some embodiments, feature data including such historical information may be fed into a prediction model in order to compute confidence scores, as described in more detail above.

The confidence score indicating the likelihood that a change in time zone represents a permanent or temporary change may be valuable in different ways, depending on the relevant product or services utilizing this information in accordance with various campaign goals and product objectives. For example, if it is important for a particular product to have access to the real-time time zone of the member (e.g., perhaps for an e-mail being sent immediately), even if this represents a temporary change in time zone, then the system is simply utilize the current time zone of the member. On the other hand, suppose it is important for a particular product to have access to the long-term time zone of the member (e.g., perhaps for weekly or monthly digest e-mails being transmitted to the member). In such case, the determination that the current time zone represents a temporary change in time zone may result in the previously established time zone of the member being utilized. On the other hand, the determination that the current time zone represents a permanent change in time zone may result in the current time zone being utilized.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a member time zone inference system 200. The member time zone inference system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
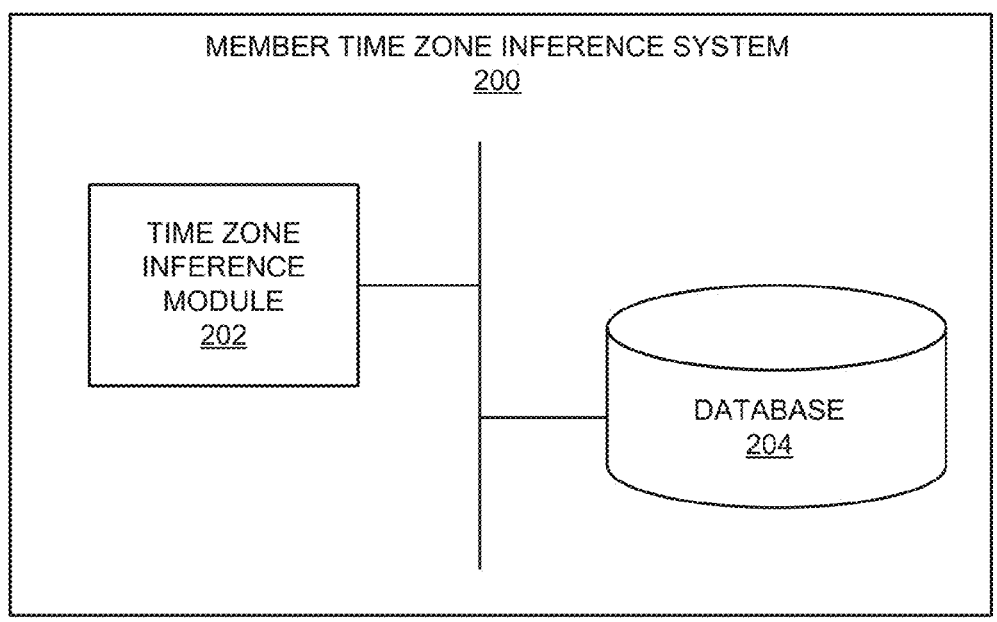
FIG. 2 is a block diagram of an example system, according to various embodiments.

Turning now to FIG. 2, a member time zone inference system 200 includes a time zone inference module 202, and a database 204. The modules of the member time zone inference system 200 may be implemented on or executed by a single device such as a time zone inference device, or on separate devices interconnected via a network. The aforementioned time zone inference device may be, for example, one or more client machines or application servers. The operation of each of the aforementioned modules of the member time zone inference system 200 will now be described in greater detail in conjunction with FIG. 3.

Figure 3:
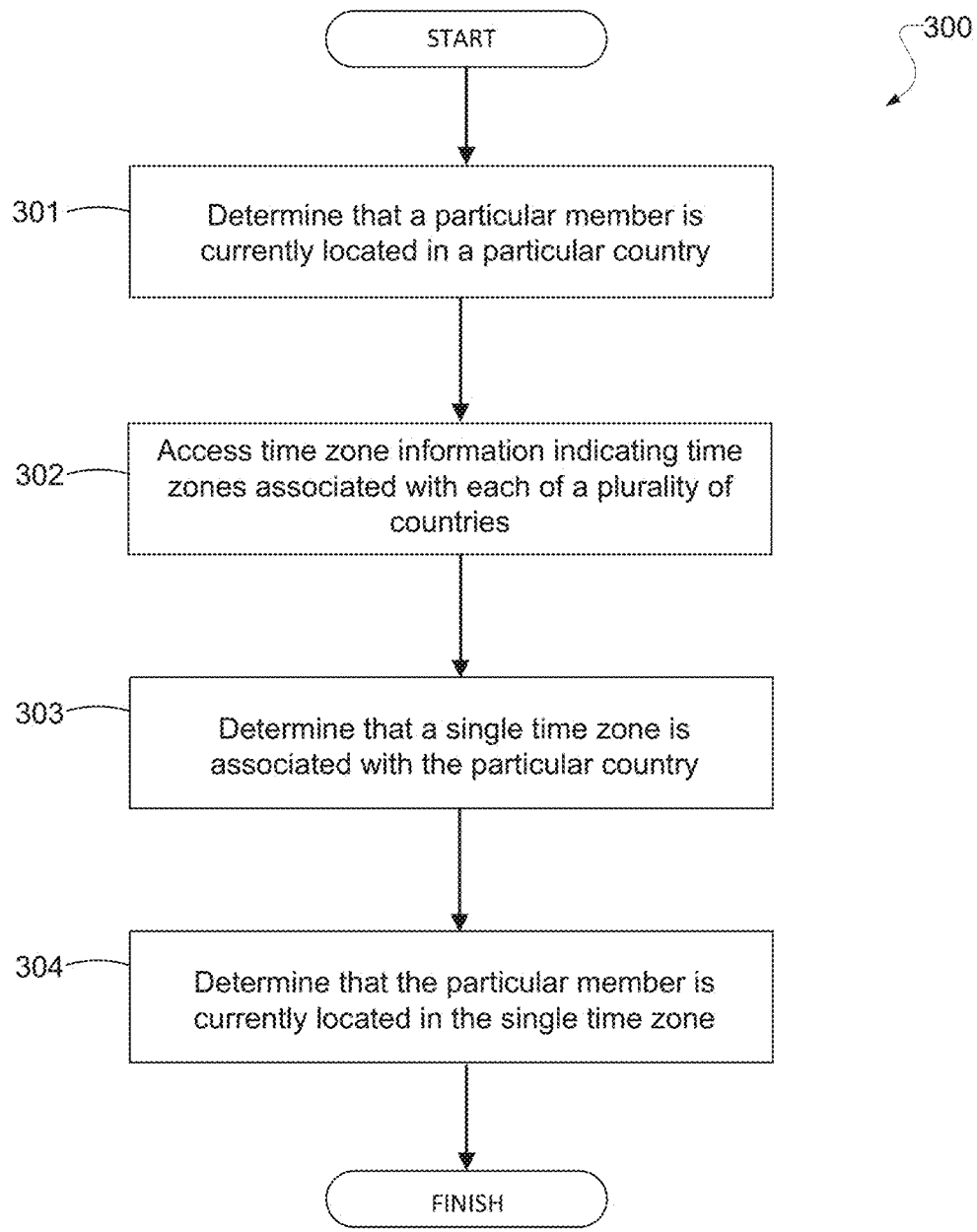
FIG. 3 is a flowchart illustrating an example method, according to various embodiments.

FIG. 3 is a flowchart illustrating an example method 300, according to various example embodiments. The method 300 may be performed at least in part by, for example, the member time zone inference system 200 illustrated in FIG. 2 (or an apparatus having similar modules, such as one or more client machines or application servers). In operation 301 in FIG. 3, time zone inference module 202 determines, based on member profile data associated with a particular member of an online social network service, that the particular member is currently located in a particular country.

For example, in some embodiments, time zone inference module 202 may determine that the particular member is currently located in the particular country by identifying a user-specified country attribute included in the member profile associated with the particular member, the user-specified country attribute indicating the particular country. As another example, in some embodiments, time zone inference module 202 may determine that the particular member is currently located in the particular country by identifying a current education attribute included in the member profile associated with the particular member, the current education attribute indicating an educational institution located in the particular country. As another example, in some embodiments, time zone inference module 202 may determine that the particular member is currently located in the particular country by identifying a current employer attribute included in the member profile associated with the particular member, the current employer attribute indicating an employer located in the particular country.

In operation 302 in FIG. 3, time zone inference module 202 accesses time zone information indicating time zones associated with each of a plurality of countries. Such time zone information may be accessible in publically available data stores or may be stored in the database 204. In operation 303 in FIG. 3, time zone inference module 202 determines, based on the time zone information, that a single time zone is associated with the particular country identified in operation 301. In operation 304 in FIG. 3, responsive to determining that a single time zone is associated with the particular country, time zone inference module 202 determines that the particular member is currently located in the single time zone. In some embodiments, time zone inference module 202 may also update the member profile data associated with the particular member to indicate that the particular member is currently located in the single time zone.

Figure 4:
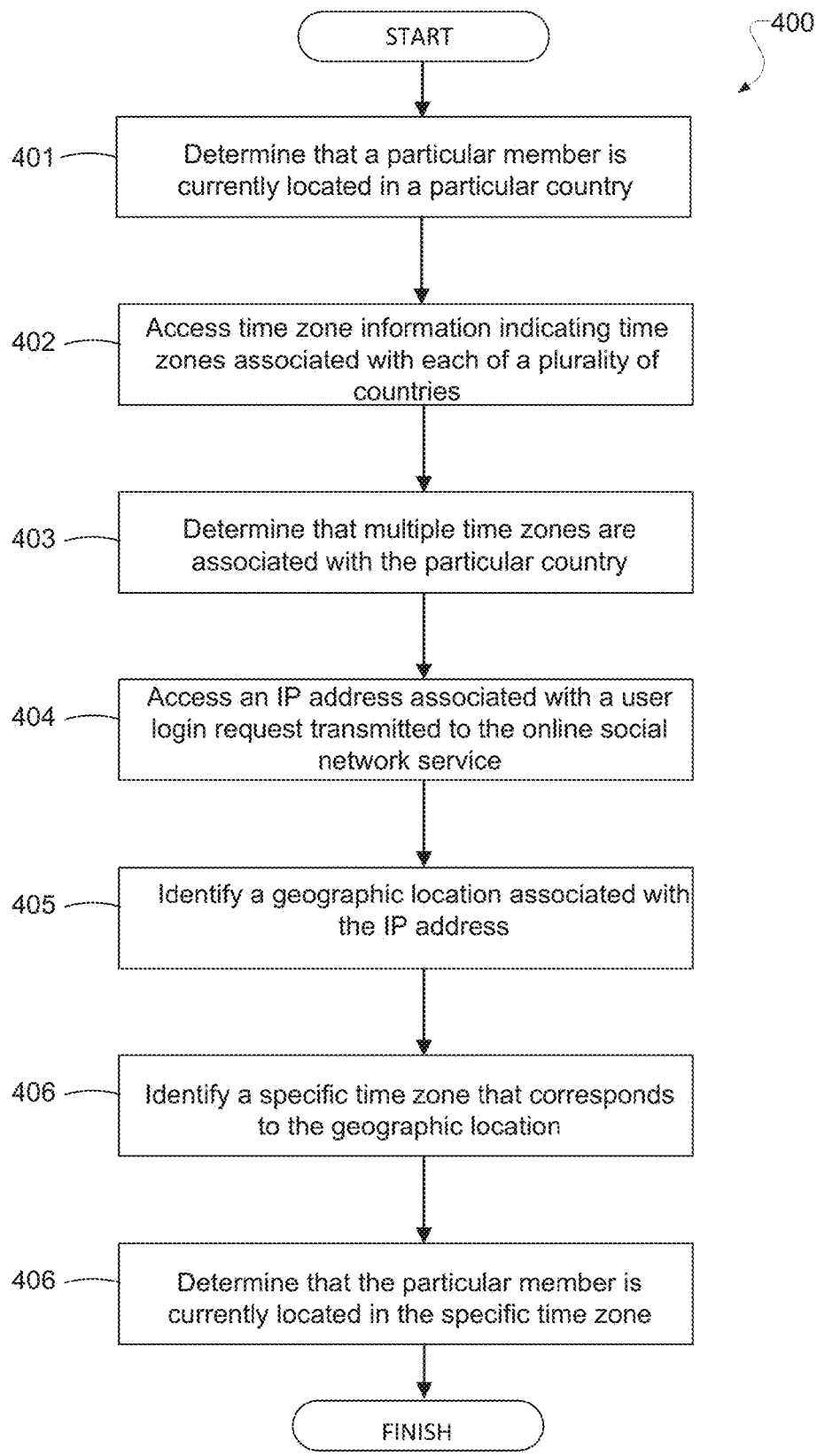
FIG. 4 is a flowchart illustrating an example method, according to various embodiments.

FIG. 4 is a flowchart illustrating an example method 400 in a case where a user is located in a country with multiple time zones, consistent with various embodiments described above. The method 400 may be performed at least in part by, for example, the member time zone inference system 200 illustrated in FIG. 2 (or an apparatus having similar modules, such one or more client machines or application servers). In operation 401, time zone inference module 202 determines, based on member profile data associated with a particular member of an online social network service, that the particular member is currently located in a particular country. In operation 402, time zone inference module 202 accesses time zone information indicating time zones associated with each of a plurality of countries. In operation 403, time zone inference module 202 determines, based on the time zone information, that multiple time zones are associated with the particular country identified in operation 401. In operation 404, time zone inference module 202 accesses an IP address associated with a user login request transmitted to a website or online social network service. In operation 405, time zone inference module 202 identifies a geographic location associated with the IP address. In operation 406, time zone inference module 202 identifies, from among the multiple time zones associated with the particular country that were identified in 403, a specific time zone that corresponds to the geographic location associated with the IP address. In operation 407, time zone inference module 202 determines that the particular member is currently located in the specific time zone identified in 406. In some embodiments, time zone inference module 202 may also update the member profile data associated with the particular member to indicate that the particular member is currently located in the specific time zone. It is contemplated that the operations of method 400 may incorporate any of the other features disclosed herein. Various operations in the method 400 may be omitted or rearranged, as necessary.

Figure 5:
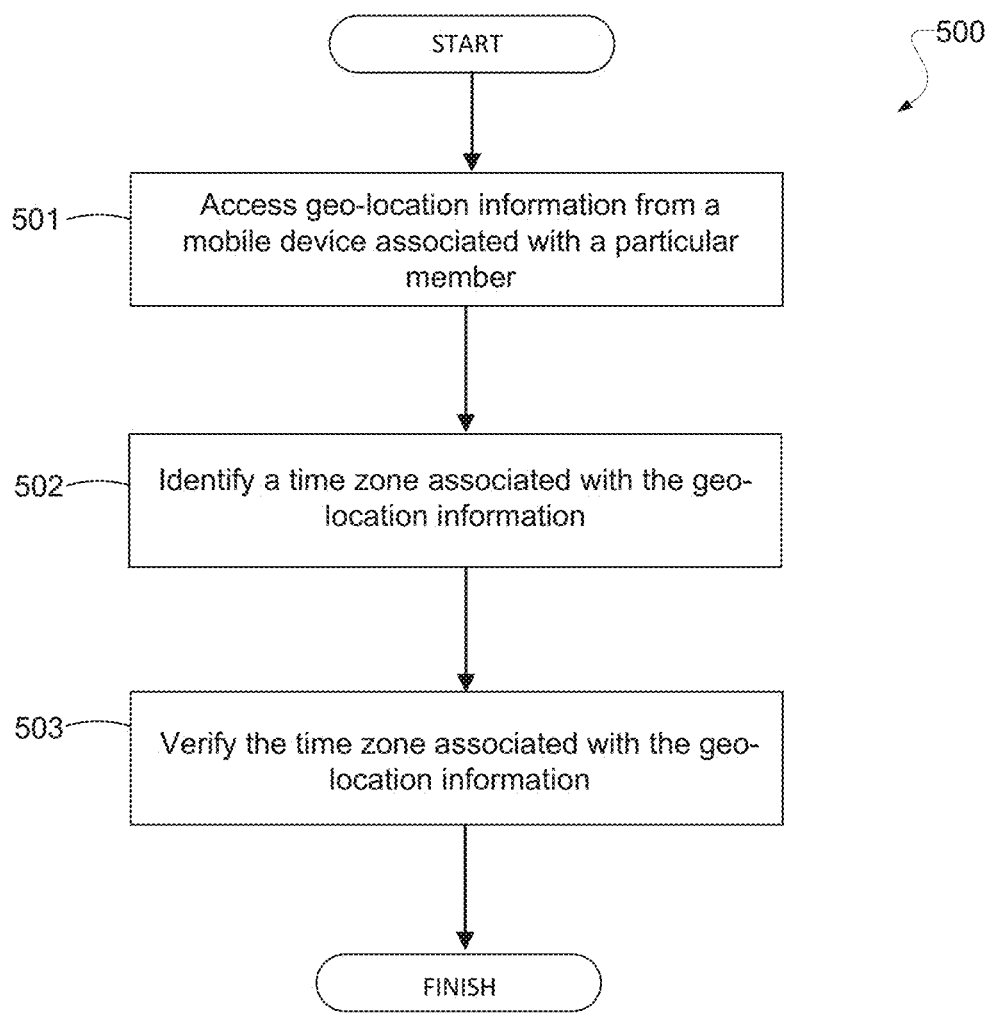
FIG. 5 is a flowchart illustrating an example method, according to various embodiments.

FIG. 5 is a flowchart illustrating an example method 500 of verifying time zone inferences based on geo-location information, consistent with various embodiments described above. The method 500 may be performed at least in part by, for example, the member time zone inference system 200 illustrated in FIG. 2 (or an apparatus having similar modules, such one or more client machines or application servers). In operation 501, time zone inference module 202 accesses geo-location information from a mobile device associated with a particular member. In operation 502, time zone inference module 202 identifies a time zone associated with the geo-location information. In operation 503, time zone inference module 202 verifies that the time zone associated with the geo-location information matches a time zone previously determined by time zone inference module 202 (e.g., the time zone determined in operation 304 in FIG. 3 or the time zone determined in operation 407 in FIG. 4). It is contemplated that the operations of method 500 may incorporate any of the other features disclosed herein. Various operations in the method 500 may be omitted or rearranged, as necessary.

Figure 6:
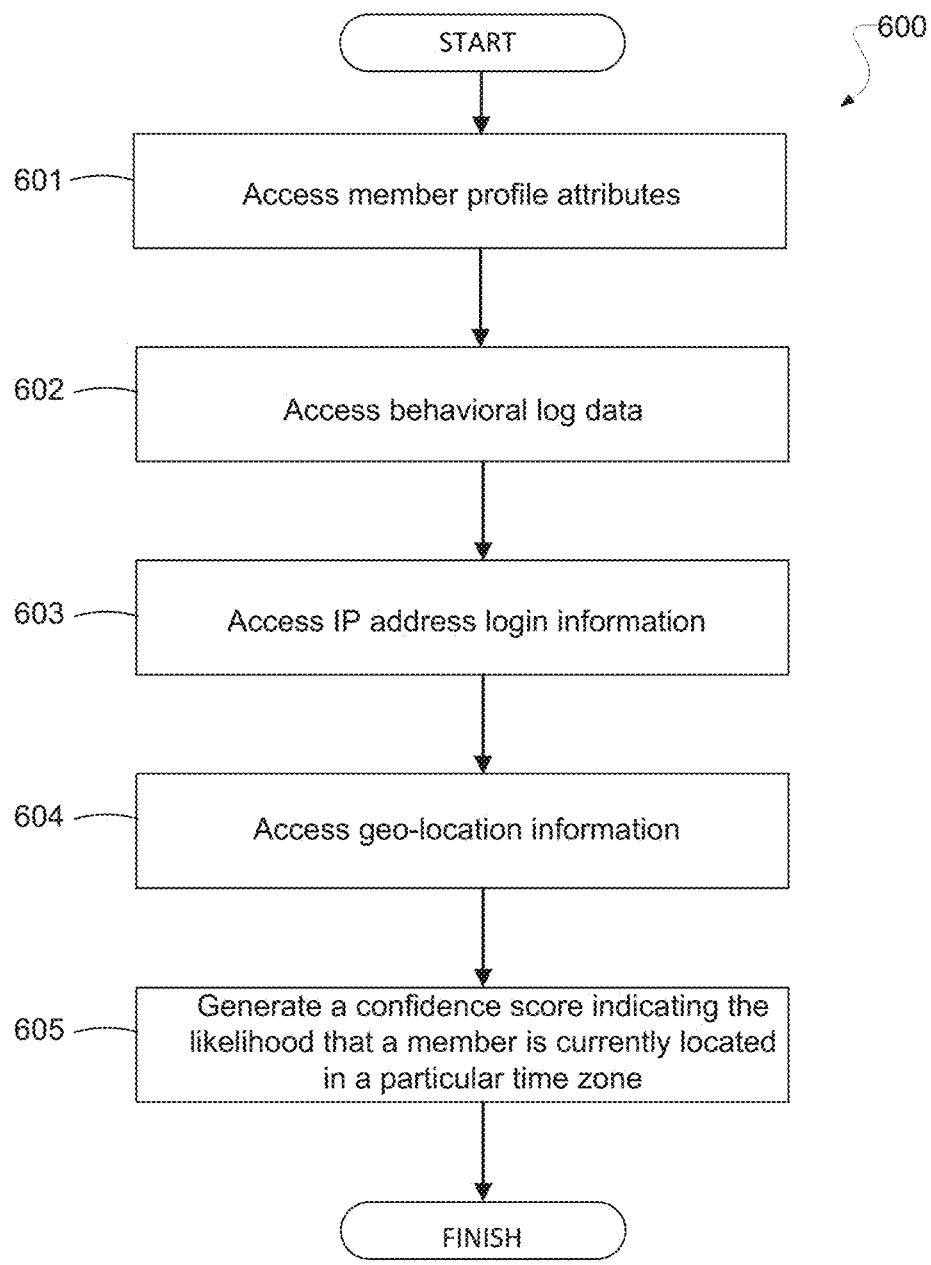
FIG. 6 is a flowchart illustrating an example method, according to various embodiments.

FIG. 6 is a flowchart illustrating an example method 600 for computing a confidence score indicating a likelihood that a user is currently located in a particular time zone, consistent with various embodiments described above. The method 600 may be performed at least in part by, for example, the member time zone inference system 200 illustrated in FIG. 2 (or an apparatus having similar modules, such one or more client machines or application servers). In operation 601, time zone inference module 202 accesses member profile attributes associated with a member. In operation 602, time zone inference module 202 accesses behavioral log data associated with the member (e.g., social activity information or interactions by the member with various features of a website). In operation 603, time zone inference module 202 accesses IP address login information associated with the member (e.g., the detected IP address when the member logs into the website). In operation 604, time zone inference module 202 accesses geolocation information from a mobile device associated with the member. In operation 605, time zone inference module 202 generates a confidence score indicating the likelihood that the member is currently located in a particular time zone. For example, one or more pieces of information accessed in operations 601-604 may be fed as feature data into a trained prediction model in order to generate the confidence score. It is contemplated that the operations of method 600 may incorporate any of the other features disclosed herein. Various operations in the method 600 may be omitted or rearranged, as necessary.

Figure 7:
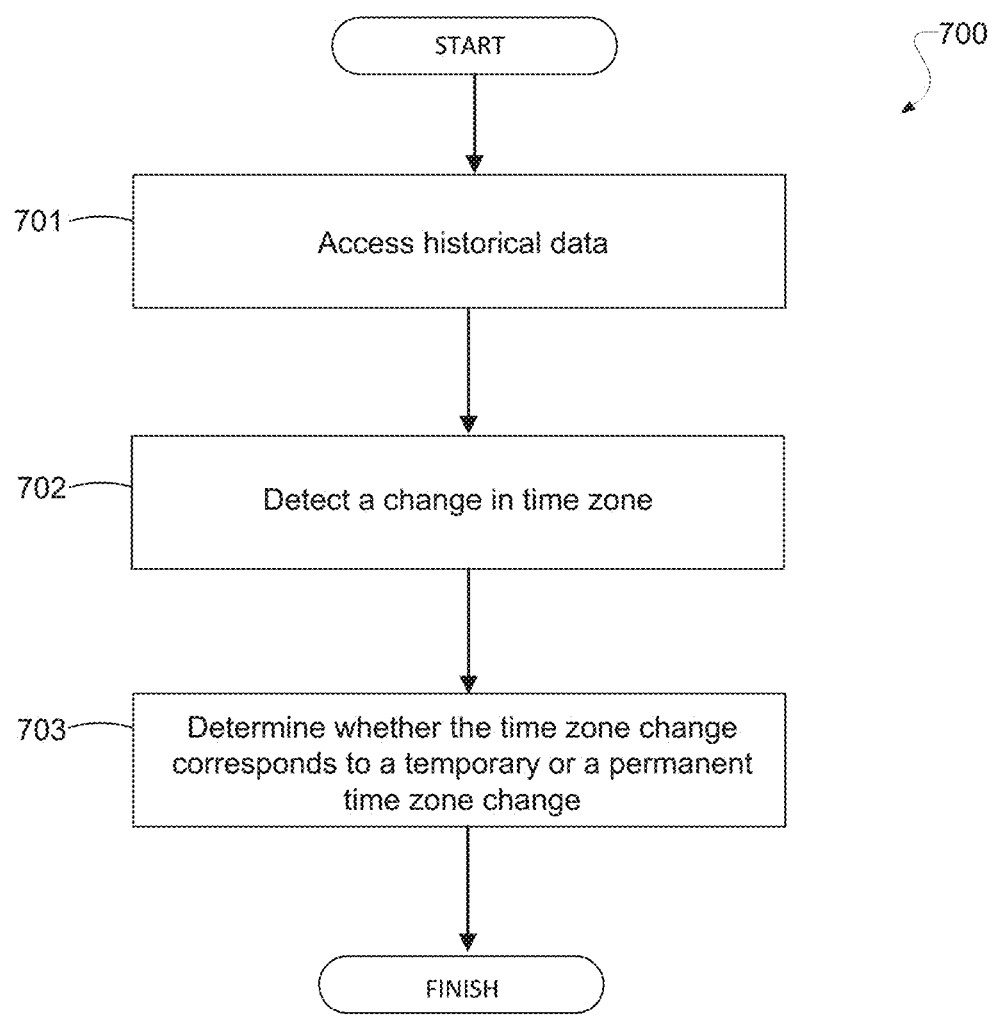
FIG. 7 is a flowchart illustrating an example method, according to various embodiments.

FIG. 7 is a flowchart illustrating an example method 700 for computing a confidence score indicating a likelihood that a time zone change is a permanent or temporary change, consistent with various embodiments described above. The method 700 may be performed at least in part by, for example, the member time zone inference system 200 illustrated in FIG. 2 (or an apparatus having similar modules, such one or more client machines or application servers). In operation 701, time zone inference module 202 accesses historical values of various types of data associated with a member (e.g., member profile data, member behavioral activity, member interactions with the site, geolocation information, IP address login information, and so on). In operation 702, time zone inference module 202 determines, based on the accessed historical values, that the current time zone of the user is different from a previous time zone of the user. In operation 703, time zone inference module 202 determines whether the time zone change corresponds to a temporary or a permanent time zone change. For example, one or more pieces of information accessed in operation 701 may be fed as feature data into a trained prediction model in order to generate a confidence score indicating the likelihood that the change corresponds to a permanent or temporary change in time zone. It is contemplated that the operations of method 700 may incorporate any of the other features disclosed herein. Various operations in the method 700 may be omitted or rearranged, as necessary.

Example Mobile Device

Figure 8:
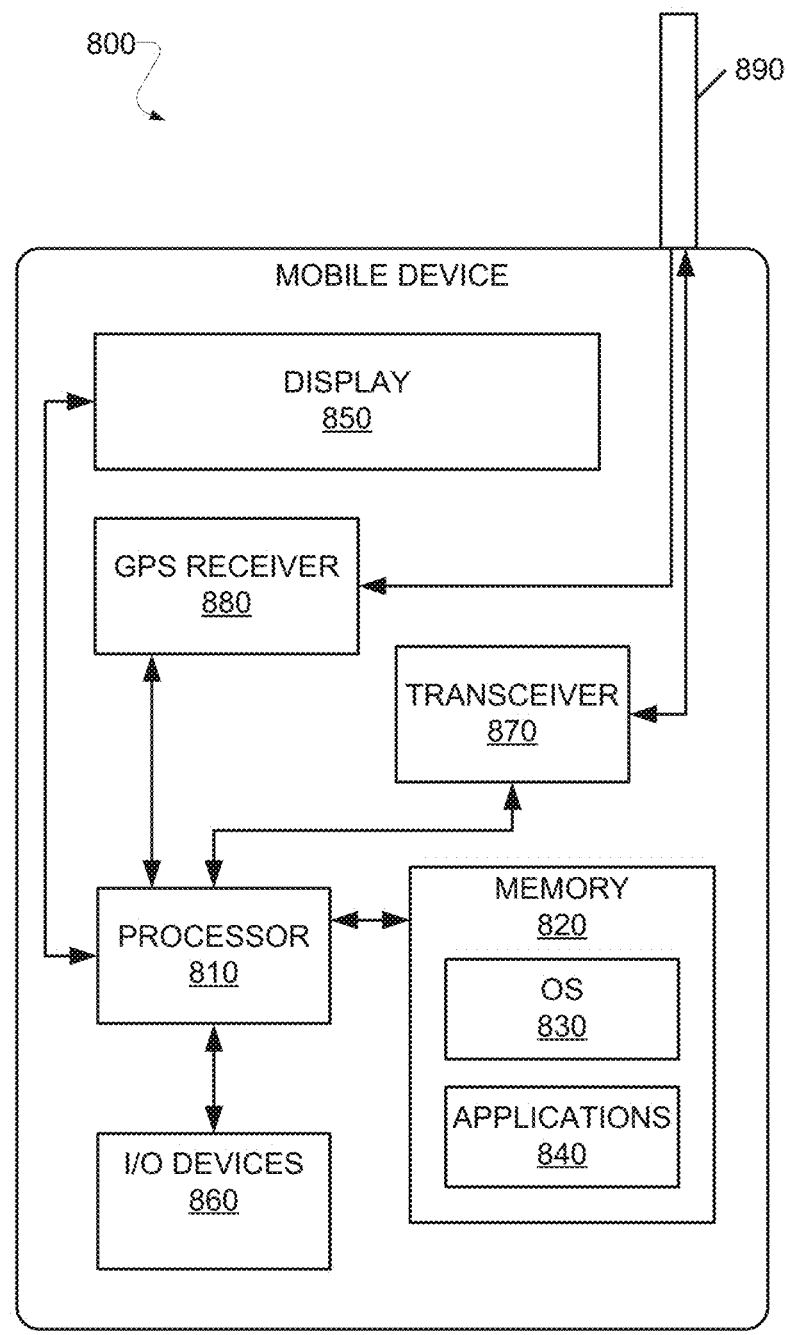
FIG. 8 illustrates an example mobile device, according to various embodiments.

FIG. 8 is a block diagram illustrating the mobile device 800, according to an example embodiment. The mobile device may correspond to, for example, one or more client machines or application servers. One or more of the modules of the system 200 illustrated in FIG. 2 may be implemented on or executed by the mobile device 800. The mobile device 800 may include a processor 810. The processor 810 may be any of a variety of different types of commercially available processors suitable for mobile devices (for example, an XScale architecture microprocessor, a Microprocessor without Interlocked Pipeline Stages (MIPS) architecture processor, or another type of processor). A memory 820, such as a Random Access Memory (RAM), a Flash memory, or other type of memory, is typically accessible to the processor 810. The memory 820 may be adapted to store an operating system (OS) 830, as well as application programs 840, such as a mobile location enabled application that may provide location based services to a user. The processor 810 may be coupled, either directly or via appropriate intermediary hardware, to a display 850 and to one or more input/output (I/O) devices 860, such as a keypad, a touch panel sensor, a microphone, and the like. Similarly, in some embodiments, the processor 810 may be coupled to a transceiver 870 that interfaces with an antenna 890. The transceiver 870 may be configured to both transmit and receive cellular network signals, wireless data signals, or other types of signals via the antenna 890, depending on the nature of the mobile device 800. Further, in some configurations, a GPS receiver 880 may also make use of the antenna 890 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
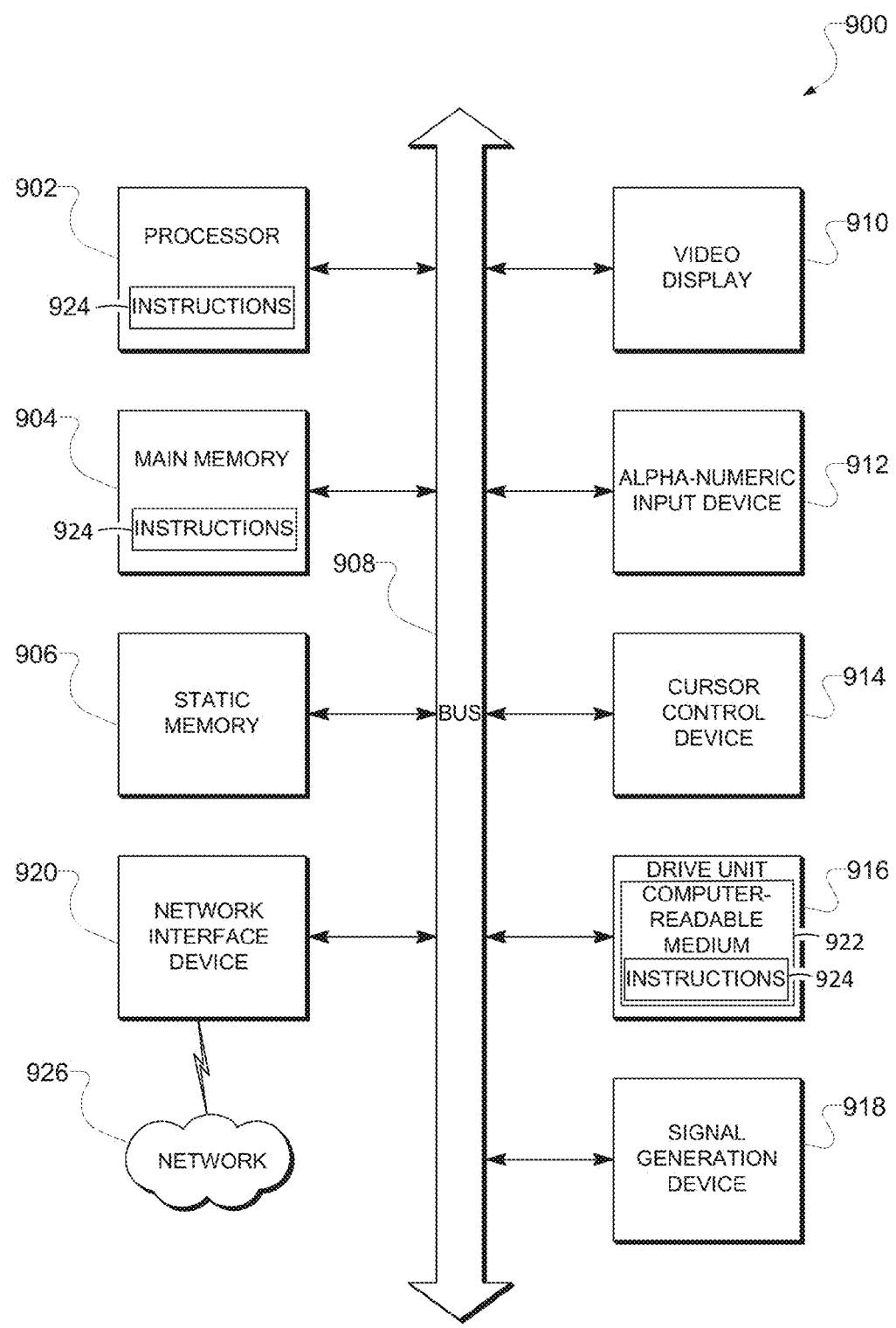
FIG. 9 is a diagrammatic representation of a machine in the example form of a computer system within which a set of instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    determining, based on member profile data associated with a particular member of an online social network service, that the particular member is located in a particular country;
    accessing time zone information for the particular country;
    determining, based on the time zone information, whether a single time zone or multiple time zones are associated with the particular country;
    responsive to determining that a single time zone is associated with the particular country, determining that the particular member is located in the single time zone;
    verifying that the single time zone matches a time zone for a mobile device associated with the particular member, wherein the time zone is determined using geolocation information; and
    updating the member profile data to indicate that the particular member is located in the single time zone.

2. The method of claim 1, wherein the determining that the particular member is currently located in the particular country further comprises:
    identifying a user-specified country attribute included in the member profile associated with the particular member, the user-specified country attribute indicating the particular country.

3. The method of claim 1, wherein the determining that the particular member is currently located in the particular country further comprises:
    identifying a current education attribute included in the member profile associated with the particular member, the current education attribute indicating an educational institution located in the particular country.

4. The method of claim 1, wherein the determining that the particular member is currently located in the particular country further comprises:
    identifying a current employer attribute included in the member profile associated with the particular member, the current employer attribute indicating an employer located in the particular country.

5. The method of claim 1, further comprising:
    accessing the geo-location information from the mobile device; and
    identifying the time zone associated with the geo-location information.

6. The method of claim 1, further comprising:
responsive to determining that multiple time zones are associated with the particular country, accessing an IP address associated with a user login request transmitted to the online social network service;
identifying a geographic location associated with the IP address;
identifying, from among the multiple time zones associated with the particular country, a specific time zone that corresponds to the geographic location associated with the IP address; and
determining that the particular member is currently located in the specific time zone.

7. The method of claim 6, further comprising:
accessing the geo-location information from the mobile device;
identifying the time zone associated with the geo-location information; and
verifying that the time zone associated with the geo-location information matches the specific time zone.

8. The method of claim 6, further comprising:
updating the member profile data associated with the particular member to indicate that the particular member is currently located in the specific time zone.

9. A system comprising:
a machine including a memory and at least one processor; and
a time zone inference module, executable by the machine, configured to:
determine, based on member profile data associated with a particular member of an online social network service, that the particular member is located in a particular country;
access time zone information for the particular country;
determine, based on the time zone information, whether a single time zone or multiple time zones are associated with the particular country;
responsive to determining that a single time zone is associated with the particular country, determine that the particular member is located in the single time zone;
verify that the single time zone matches a time zone for a mobile device associated with the particular member, wherein the time zone is determined using geolocation information; and
update the member profile data to indicate that the particular member is located in the single time zone.

10. The system of claim 9, wherein the time zone inference module is further configured to determine that the particular member is currently located in particular country further by:
identifying a user-specified country attribute included in the member profile associated with the particular member, the user-specified country attribute indicating the particular country.

11. The system of claim 9, wherein the time zone inference module is further configured to determine that the particular member is currently located in the particular country by:
identifying a current education attribute included in the member profile associated with the particular member, the current education attribute indicating an educational institution located in the particular country.

12. The system of claim 9, wherein the time zone inference module is further configured to determine that the particular member is currently located in the particular country by:
identifying a current employer attribute included in the member profile associated with the particular member, the current employer attribute indicating an employer located in the particular country.

13. The system of claim 9, wherein the time zone inference module is further configured to:
access the geo-location information from the mobile device; and
identify the time zone associated with the geo-location information.

14. The system of claim 9, wherein the time zone inference module is further configured to:
responsive to determining that multiple time zones are associated with the particular country, access an IP address associated with a user login request transmitted to the online social network service;
identify a geographic location associated with the IP address;
identify, from among the multiple time zones associated with the particular country, a specific time zone that corresponds to the geographic location associated with the IP address; and
determine that the particular member is currently located in the specific time zone.

15. The system of claim 14, wherein the time zone inference module is further configured to:
access the geo-location information from the mobile device;
identify the time zone associated with the geo-location information; and
verify that the time zone associated with the geo-location information matches the specific time zone.

16. The system of claim 14, wherein the time zone inference module is further configured to:
update the member profile data associated with the particular member to indicate that the particular member is currently located in the specific time zone.

17. A non-transitory machine-readable storage medium comprising instructions that, when executed by one or more processors of a machine, cause the machine to perform operations comprising:
determining, based on member profile data associated with a particular member of an online social network service, that the particular member is located in a particular country;
accessing time zone information for the particular country;
determining, based on the time zone information, whether a single time zone or multiple time zones are associated with the particular country;
responsive to determining that a single time zone is associated with the particular country, determining that the particular member is located in the single time zone;
verifying that the single time zone matches a time zone for a mobile device associated with the particular member, wherein the time zone is determined using geolocation information; and
updating the member profile data to indicate that the particular member is located in the single time zone.

18. The storage medium of claim 17, wherein the operations comprise:
responsive to determining that multiple time zones are associated with the particular country, accessing an IP address associated with a user login request transmitted to the online social network service;

identifying a geographic location associated with the IP address;

identifying, from among the multiple time zones associated with the particular country, a specific time zone that corresponds to the geographic location associated with the IP address; and determining that the particular member is currently located in the specific time zone.

\* \* \* \* \*